United States Patent
Guang

(10) Patent No.: US 12,131,281 B1
(45) Date of Patent: Oct. 29, 2024

(54) END-TO-END MACHINE LEARNING

(71) Applicant: Jumio Corporation, Palo Alto, CA (US)

(72) Inventor: Lei Guang, Montreal (CA)

(73) Assignee: Jumio Corporation, Sunnyvale, CA (US)

( * ) Notice: Subject to any disclaimer, the term of this patent is extended or adjusted under 35 U.S.C. 154(b) by 333 days.

(21) Appl. No.: 17/489,176

(22) Filed: Sep. 29, 2021

(51) Int. Cl.
| | |
|---|---|
| *G06Q 10/06* | (2023.01) |
| *G06F 18/21* | (2023.01) |
| *G06N 5/043* | (2023.01) |
| *G06N 20/20* | (2019.01) |
| *G06Q 10/0639* | (2023.01) |

(52) U.S. Cl.
CPC ... *G06Q 10/06395* (2013.01); *G06F 18/2178* (2023.01); *G06N 5/043* (2013.01); *G06N 20/20* (2019.01)

(58) Field of Classification Search
CPC .................................................... G06Q 10/06
USPC ...................................................... 705/7.12
See application file for complete search history.

(56) References Cited

U.S. PATENT DOCUMENTS

| | | | |
|---|---|---|---|
| 11,399,041 B1 * | 7/2022 | Kannan | H04L 63/1433 |
| 11,556,815 B1 * | 1/2023 | Stave | G06N 20/20 |
| 2018/0150758 A1 * | 5/2018 | Niininen | H04L 41/147 |
| 2020/0104774 A1 * | 4/2020 | Sun | G06Q 10/06393 |
| 2020/0285697 A1 * | 9/2020 | Balasubramanian | G06F 16/355 |
| 2021/0326744 A1 * | 10/2021 | Israel | G06N 5/02 |
| 2022/0046031 A1 * | 2/2022 | Kaidi | H04L 63/1433 |
| 2022/0207352 A1 * | 6/2022 | Barr | G06F 17/18 |
| 2022/0207353 A1 * | 6/2022 | Barr | G06N 3/08 |
| 2022/0224721 A1 * | 7/2022 | Bertiger | H04L 41/0686 |
| 2023/0092819 A1 * | 3/2023 | Karlsson | G06N 20/00 706/12 |
| 2023/0098165 A1 * | 3/2023 | Shi | G06F 11/0709 709/223 |

* cited by examiner

*Primary Examiner* — Nga B Nguyen
(74) *Attorney, Agent, or Firm* — Patent Law Works, LLP

(57) ABSTRACT

The disclosure includes a system and method for obtaining, using one or more processors, case management signal data associated with one or more alerts, the case management signal data based on human interaction; training, using the one or more processors, a first model based on the case management signal data associated with the one or more alerts; and applying, using the one or more processors, the first model.

16 Claims, 13 Drawing Sheets

END-TO-END MACHINE LEARNING

BACKGROUND

Machine learning models may be trained and applied to obtain results. Training a machine learning model generally requires large amounts of training data if the machine learning model is to be reliable and accurate. For example, when training a classifier to classify images into classes "Dog" and "Not Dog," many images of dogs and not dogs are provided. In some use cases, the machine learning model may be trained using prior results or actions obtained from humans. In the case of supervised machine learning and the preceding example classifier, the human-derived results may take the form of labels, i.e., "Dog" or "Not Dog," associated with each image in the training data.

SUMMARY

This specification relates to methods and systems for obtaining, using one or more processors, case management signal data associated with one or more alerts, the case management signal data based on human interaction; training, using the one or more processors, a first model based on the case management signal data associated with the one or more alerts; and applying, using the one or more processors, the first model.

Other implementations of one or more of these aspects include corresponding systems, apparatus, and computer programs, configured to perform the actions of the methods, encoded on computer storage devices.

These and other implementations may each optionally include one or more of the following features. For instance, the applying the first model generates one or more new alerts, the one or more new alerts associated with a reduced incidence of false positives. For instance, the second algorithm is an explainability algorithm for explaining a result of the first model. For instance, the computer implemented method may include: determining first alert-generating data associated with the one or more alerts, a first alert generating data included in detection data, the detection data including the first alert-generating data and first non-alert-generating data; training, prior to training the first model, a second model based on the first alert-generating data and the case management signal data associated with the one or more alerts. For instance, the first model is trained based on the case management signal data, the second alert-generating data, and the second non-alert-generating data. For instance, the second model is a first true-positive model and the first model is a second true positive model. For instance, the case management signal data includes one or more of case closure data, escalation data, time on page, and one or more comment quality metrics. For instance, the first model based on the case management signal data associated with the one or more alerts, is trained using the training data with the one or more fairness coefficients applied. For instance, the case management signal data associated with one or more alerts that is obtained and used to train the first model may include the case management signal data may include the consortium data.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Machine learning models may be trained and applied to obtain results. In some use cases, the machine learning model may be trained using prior results or actions obtained from humans. A first problem is training a machine learning model results are sparse or non-existent. A second problem is that humans are not free from bias, and using human-derived results in training may enshrine human bias into the machine learning algorithm and perpetuate that bias. A third problem is how do evaluate quality of human-derived results.

For example, consider the following example scenario, Entities, such as banks, may seek to identify suspicious activity. For example, an entity may seek to identify and report suspicious activity to comply with regulations of one or more jurisdictions (e.g., to prevent terrorist financing, to prevent money laundering, etc.). When suspicious activity is identified, a case may be opened to investigate the suspicious activity. Upon investigation, the case may be escalated and a Suspicious Activity Report (SAR) generated and filed.

After the SAR is filed, there is no way of knowing the outcome, i.e., no known result. For example, it is unknown whether the suspicious activity was malfeasance and resulted in a conviction, or did not. Therefore, there is no explicit ground-truth or result. Additionally, the number of SAR reports is multiple orders of magnitude smaller than the number of activities (e.g., transactions) monitored, which means that relying solely on those transactions associated with a SAR report may result in overfitting and, perhaps, many false-negatives. The systems and methods described herein may address, at least in part, the issues of having no or sparse results.

Additionally, the cases are investigated by human case managers. Some may be good at their job and other may be less good or even bad. Furthermore, case managers may have biases, whether conscious or not, that effect the case and whether the case is closed or escalated. These variations in ability and impartiality may be represented in the human-derived results and effect the machine learning model trained using those human derived results. For example, if case managers are implicitly biased, using their case escalations and closures to train a machine learning model may result in a machine learning model that is similarly biased, which is undesirable. The systems and methods described herein may address, at least in part, the issues of having no or sparse results.

It should be recognized that the description, language, and examples herein are selected for clarity and convenience. Therefore, while the present disclosure may refer to SARs, suspicious activity, cases, case managers, etc. many alerts, case management signals, detection data, and processes are within the scope of the present disclosure and may benefit from the systems and methods described herein.

Example System

Figure 1:
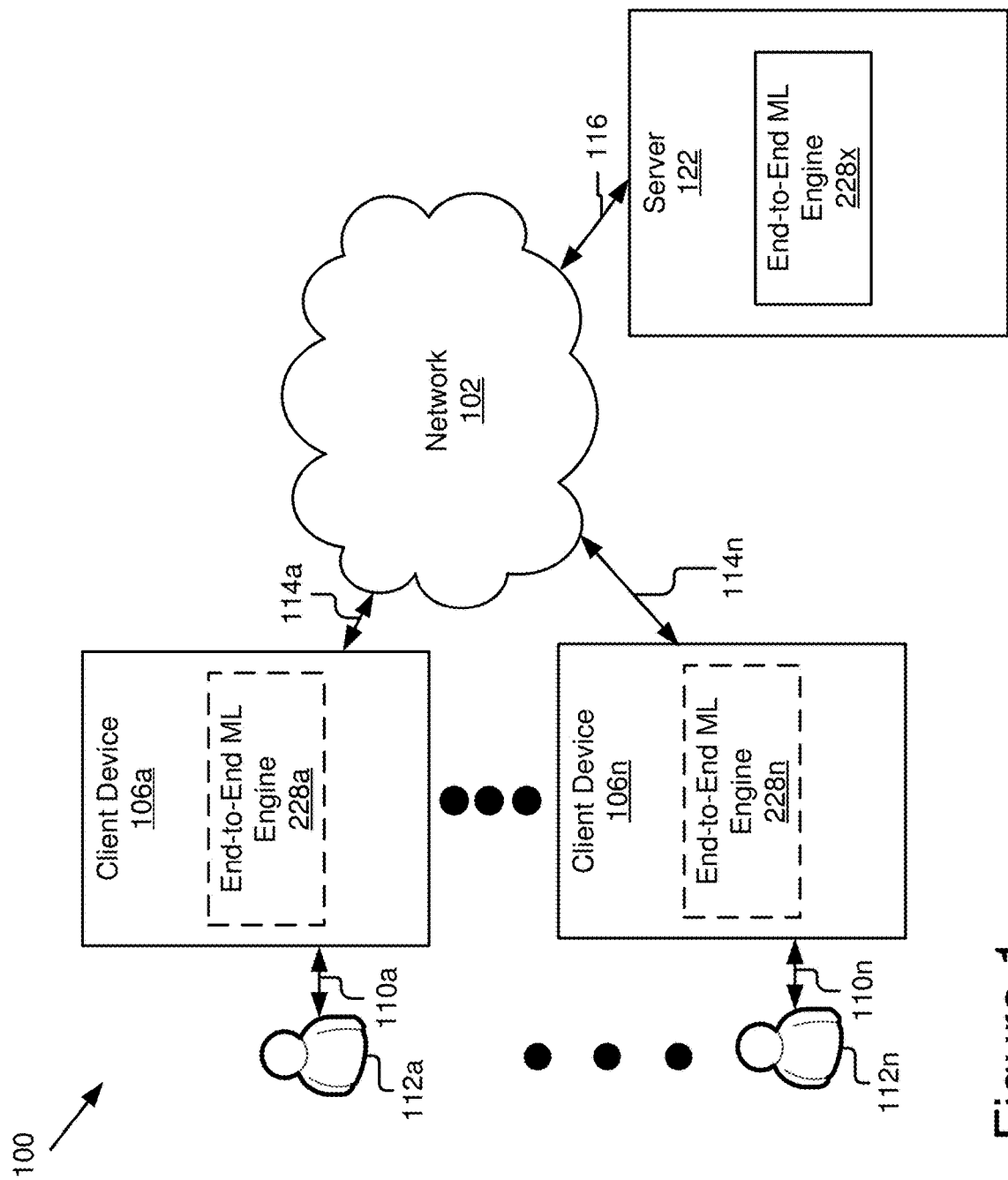
FIG. 1 illustrates a block diagram of one example system for end-to-end machine learning in accordance with some implementations.

FIG. 1 is a block diagram of an example system 100 end-to-end machine learning in accordance with some implementations. As depicted, the system 100 includes a server 122 and client devices 106a and 106n coupled for electronic communication via a network 102. The client devices 106a or 106n may occasionally be referred to herein individually as a client device 106 or collectively as client devices 106. Although two client devices 106 are shown in FIG. 1, it should be understood that there may be any number of client devices 106.

A client device 106 is a computing device that includes a processor, a memory, and network communication capabilities (e.g., a communication unit). The client device 106 is coupled for electronic communication to the network 102, as illustrated by signal line 114, and may be accessed by a user 112 as illustrated by line 110. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although two client devices 106 are shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

In some implementations, the user 112 is a human user and occasionally referred to herein as person, individual, case manager, agent, or similar.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit). The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client-side or server-side. Furthermore, various entities of the system may be integrated into a single computing device or system or divided into additional computing devices or systems, etc.

For example, as depicted, the client device 106 may optionally (as indicated by the dashed lines) include an instance of the end-to-end machine learning (ML) engine 228a/n and the server 122 may include an instance of the end-to-end ML engine 228x. However, in some implementations, the components and functionality of the end-to-end ML engine 228 may be entirely client-side (i.e., at 228a/n), entirely server side (i.e., at 228x), or divide among the client device 106 and server 122 (i.e., divided across 228a/n and 228x).

Figure 2:
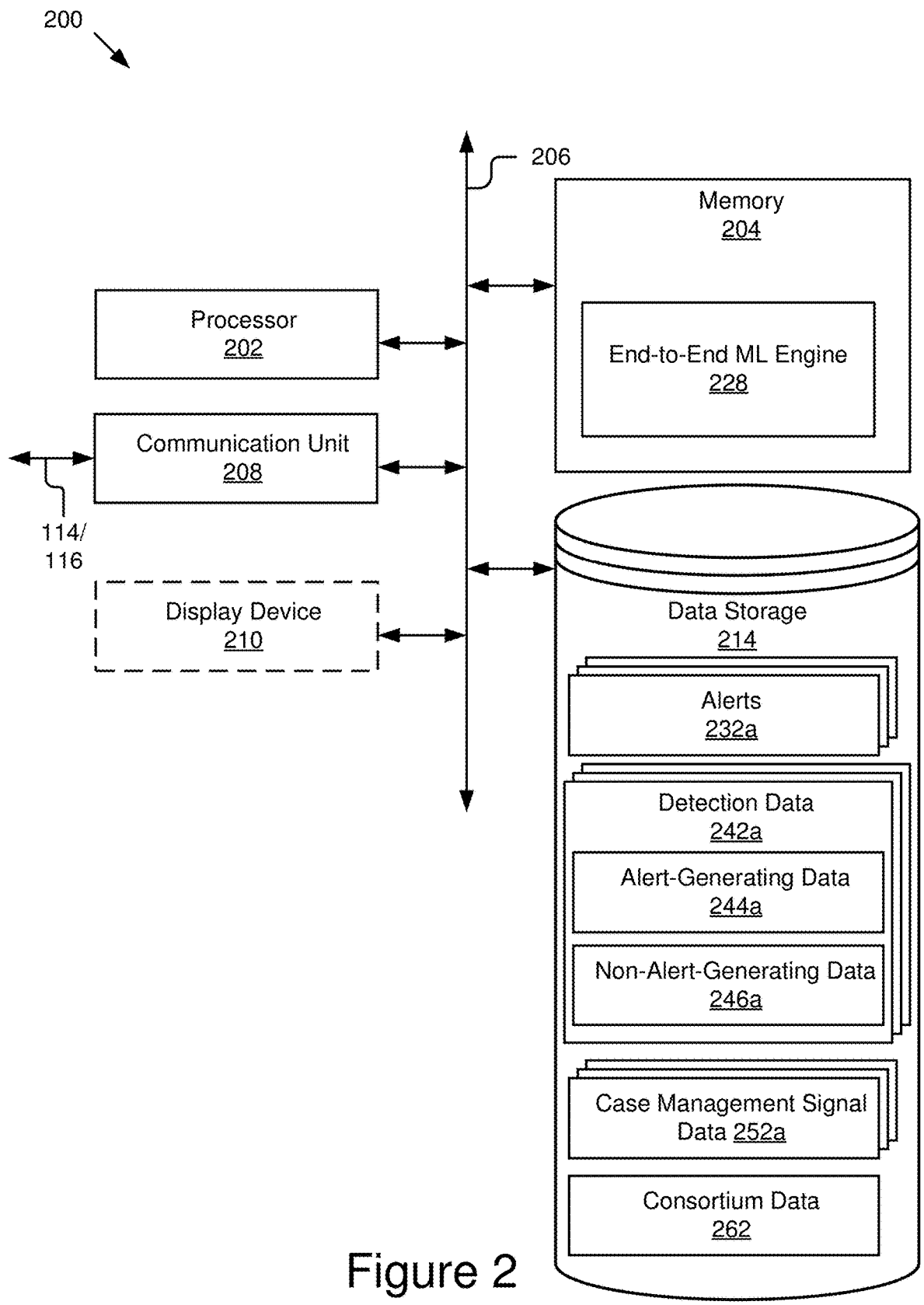
FIG. 2 illustrates a block diagram of an example computing device in accordance with some implementations.

FIG. 2 is a block diagram of an example computing device 200 including an instance of the end-to-end ML engine 228. In the illustrated example, the example the computing device 200 includes a processor 202, a memory 204, a communication unit 208, a display device 210, and a data storage 214. In one implementation, the computing device 200 is a client device 106, the memory 204 stores the end-to-end ML engine 228a/n, and the communication unit 208 is communicatively coupled to the network via signal line 114. In another implementation, the computing device 200 is a server 122, the memory 204 stores the end-to-end ML engine 228x, and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device 200. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the end-to-end ML engine 228. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The memory stores the end-to-end ML engine 228. The end-to-end machine learning (ML) engine 228 may include software and/or logic for generating a report. The end-to-end ML engine 228 is coupled to operate in conjunction with the processor 202 to apply machine learning to a process end-to-end.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display device 210 represents any device equipped to display electronic images and data as described herein.

The data storage 214 is a non-transitory memory that stores data for providing the functionality described herein. The data storage 214 may include one or more non-transitory computer-readable mediums for storing the data. In some implementations, the data storage 214 may be incorporated with the memory 204 or may be distinct therefrom. The data storage 214 may be a dynamic random-access memory (DRAM) device, a static random-access memory (SRAM) device, flash memory, or some other memory devices. In some implementations, the data storage 214 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 214 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The data storage 214 is communicatively coupled to the bus 206.

The data storage 214 may store, among other data, a plurality of alerts 232, e.g., illustrated by alert 232a and the other boxes associated with other alert instances (unlabeled) layered behind alert 232a; detection data 242, e.g., illustrated by detection data 242a and the other boxes associated with other instances (unlabeled) of detection data layered behind detection data 242a; one or more machine learning models (not shown), or algorithms; case management data signal data 252, e.g., illustrated collectively by case management signal data 252a and the other boxes associated with other instances (unlabeled) of case management signal data layered behind case management signal data 252a; consortium data 262. In some implementations, detection data 242 may include alert-generating data 244 and non-alert-generating data 246. Non-alert-generating data 246 is detection data 242 that is not associated with an alert. For example, a benign transaction such as a recurring transfer of funds from an employer to an employee representing an auto-deposit of an employee's paycheck. Alert-generating data 244 is detection data 242 that is associated with an alert. For example, a transaction such as a transfer to an entity on a terrorist watch list, a series of transactions just under a $10 k reporting limit, a transaction between two parties using a method of payment belonging to a third party, etc.

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

For clarity and convenience, the description herein may reference example use cases and scenarios; however, these are merely examples provided to facilitate understanding, and other use cases and scenarios exist and are within the scope of the disclosure. In one example use case and scenario referenced throughout this description, an alert is generated responsive to a detection of suspicious activity based on a machine learning model. The activity being monitored for the suspicious activity is financial activity. For example, the financial activity is financial transactions processed by a large institution, such as a bank, and, therefore, high-volume. A case is associated with one or more alerts is opened to investigate suspicious activity (e.g., suspected money laundering, terrorist financing, fraud, etc.). The case may be closed, by a case manager, indicating that the suspicious activity was benign, or the case may be escalated. After escalation to a certain level, no further information is available. For example, a suspicious activity report (SAR) is filed with a jurisdiction and an outcome is unavailable to the system 100.

Figure 3:
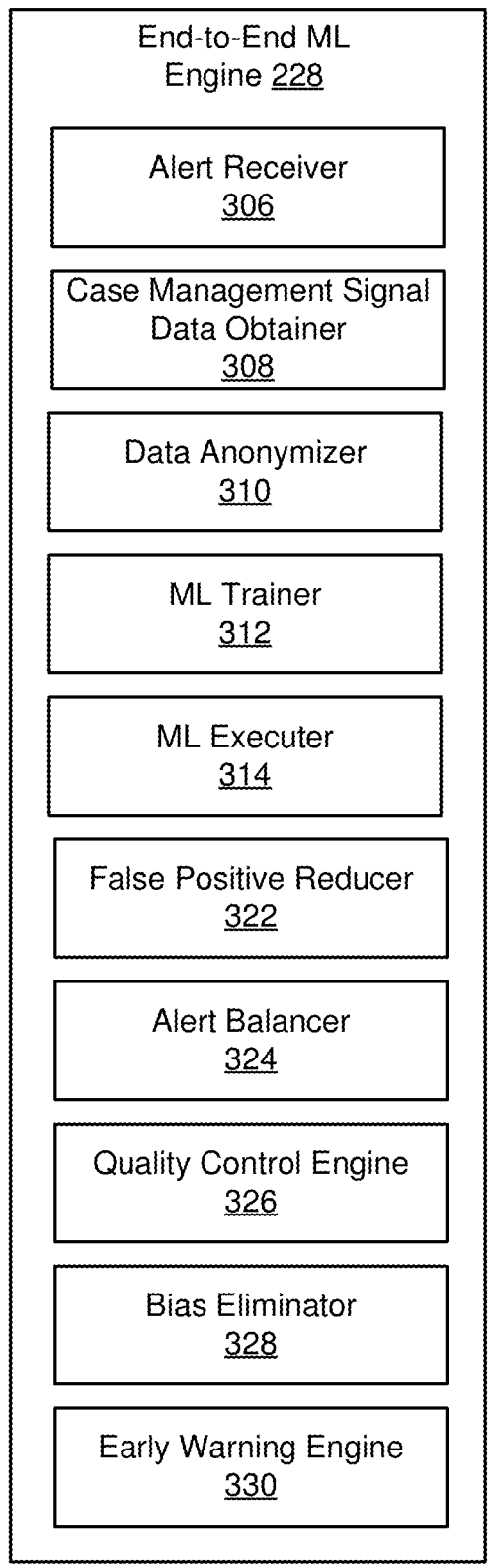
FIG. 3 illustrates a block diagram of an example end-to-end machine learning engine in accordance with some implementations.

Referring now to FIG. 3, a block diagram of an example end-to-end ML engine 228 is illustrated in accordance with one implementation. As illustrated in FIG. 3, the end-to-end ML engine 228 may include an alert receiver 306, a case management signal data obtainer 308, a data anonymizer 310, machine learning (ML) trainer 312, a machine learning (ML) executer 314, a false-positive reducer 322, an alert balancer 324, a quality control (QC) engine 326, a bias eliminator 328, and an early warning engine 330.

In some implementations, the system 100 generates an alert when a machine learning algorithm is applied, e.g., by the ML executer 314 described below, to detection data 242 and suspicious activity is identified by the machine learning model. For example, the detection data 242 may represent transaction data, and detection data instance 242a may be transaction data for a particular financial institution, referred to herein as "Bank A." Within Bank A's transaction data, represented by detection data 242a, there are some transactions that results in or are associated with an alert, represented by alert-generating data 244a, and some transactions that do not trigger an alert, represented by non-alert generating data 246a. For example, the machine learning algorithm may generate a "structuring" alert based on a series of transactions just below the $10,000 reporting limit over a short period of time. Structuring is a form of money laundering, and the series of transactions are an example of, and included in, the alert generating data 244a.

The alert receiver 306 may include software and/or logic for obtaining one or more alerts 232. The alert receiver 306 is communicatively coupled to obtain the one or more alerts 232. For example, the alert receiver 306 may be communicatively coupled to one or more of the memory 204 and the data storage 214 to retrieve the one or more alerts 232. As another example, the alert receiver 306 may be communicatively coupled to one or more components or subcomponents of the end-to-end ML engine 228, such as the ML executer 314 to receive the one or more alerts 232.

The case management signal data obtainer 308 may include software and/or logic for obtaining case management signal data 252. In some implementations, the case management signal data is data based on human interaction with a case. For example, the case management data describes the interaction, describes a result of the interaction, or provides metadata describing context of the interaction(s).

Examples of case management signal data may include, but are not limited to, case closure data, escalation data, time on page, comment quality metrics, other interaction data (e.g., number of times a case was opened and closed, how many times a case was edited), or other metadata (e.g., context metadata describing context of an interaction).

Case closure data may represent closure of one or more cases, e.g., by the case manager(s) assigned to the case or a supervisor. In some implementations, a case closure may be indicative of a false-positive as activity was determined to be suspicious, an alert generated, a case opened (which may be automatic in some implementations), but that case was then closed. In some implementations, when a case is closed, a "closed" or other class label may be assigned, which may be obtained by the case management signal data obtainer 308.

Case escalation data may represent escalation of one or more cases. In some implementations, a case may be escalated one or more times. For example, a case may be escalated by a case manager to a supervisor, and in some implementations to a third individual for a tertiary review. In some implementations, escalation indicates that the case and/or the alerts associated therewith are more likely to be a true-positive. In some implementations, when a case is escalated, a "escalated," "SAR filed," or other class label may be assigned, which may be obtained by the case management signal data obtainer 308.

Time on page may represent an amount of time a case was open on a user's client device 106 for review and editing of the case. More time may be indicative that the associated suspicious activity is indeed suspicious and required investigation. In some implementations, the time on page may not include, or have subtracted from it, idle time (e.g., one or more of time where mouse movement and/or keystrokes have not been detected for more than X second, or minutes, time where the case manager's screen is locked or screen saver is on, time where the case is open in the background but the case manager is interacting with a different application or case, etc.).

Comment quality metrics are metrics associated with the human provided comments. Examples of comment quality metrics may include, but are not limited to, one or more of a presence of comments, a number of characters in the comment(s), a number of words in the comment(s), a number of sentences in the comment(s), a number of paragraphs in the comment(s), a presence of a reference to supporting documentation, a number of references to supporting documentation, etc. In some implementations, a comment quality metric correlates to and is indicative of a likelihood of a true-positive. For example, a higher comment quality metric may represent a greater amount of investigation, analysis, and care is taken with regard to the case and investigating the suspicious activity, and, therefore, the system 100 was correct in generating the alert and identifying the activity as suspicious.

Context metadata describes a context of the human interaction with the case. Examples of context metadata may include, but are not limited to, a time of the interaction (e.g., did the interaction occur during business hours, in the evening, in the middle of the night, etc.), a user's geographic or network location (e.g., latitude and longitude, IP address, etc., which may indicate whether the user is working from home, at the office, or elsewhere); a device used to interact with the case (e.g. a MAC address, electronic serial number, or other identifier which may indicate whether the device is work computer, personal computer, mobile device, etc.). In some implementations, the context data may indicate whether the case is more or less likely to be a true-positive. For example, when a case manager interacts with a case during business hours at the office and later that day from home, it may indicate that the case is important and the alert generated and/or the associated suspicious activity is likely a true-positive.

It should be recognized that the foregoing are merely examples of case management signal data and that other signals exist and are within the scope of this disclosure. For example, other interactions, such as phone calls or searches made while the case is opened (e.g., presented to the case manager on the case manger's client device 106), may be obtained by the case management signal data obtainer 308 in some implementations.

The case management signal data obtainer 308 is communicatively coupled to obtain the case management signal data 252. For example, the case management signal data obtainer 308 may be communicatively coupled to one or more of the memory 204, the data storage 214, and the client device 106 to obtain the case management signal data 252.

The case management signal data obtainer 308 is communicatively coupled to provide the case management signal data 252 to one or more components of the end-to-end ML engine 228 or a subcomponent thereof. For example, case management signal data obtainer 308 may be communicatively coupled to one or more of the memory 204, the data storage 214 to store the case management signal data 252. In another example, the case management signal data obtainer 308 may be communicatively coupled to send the case management signal data to one or more components of the end-to-end ML engine 228 (e.g., 312, 314, 322, 324, 326, 328, or 330) or a subcomponent thereof.

The data anonymizer 310 may include software and/or logic for anonymizing data. In some implementations, the data anonymizer 310 may perform one or more anonymizations based on the use cast. For example, the anonymization performed by the data anonymizer 310 may vary based on the use case.

For example, as is described below with reference to FIG. 7 and the bias eliminator 328, in some implementations and use cases, elimination of bias based on a protected class (e.g., race, religion, color, national origin, age, physical disability, mental handicap, sex) is described. In such implementations, the data anonymizer 310 may anonymize individuals by redacting or obfuscating personal identifying information, such as a person's name, street address, account number, month and day of birth, etc., but leave information associated one or more protected classes. In some implementations, the protected class information may be anonymized through obfuscation, such as replacement with a proxy. For example, race may be numeric "1, 2, 3, etc." so that it may not be discernable what race "1" is but the bias eliminator 328 may determine whether a bias exists against race "1," and may counteract the bias.

As another example, in some implementations, consortium data 262 is aggregated across multiple entities. For example, the consortium data 262 may include alerts 232 detection data 242, and case management signal data 252 associated with multiple different banks. In such implementations, the data anonymizer 310 may apply anonymization of data prior to inclusion in the consortium data 262. For example, the data anonymizer 310 anonymizes data 232/242/252 based on one or more of the entity's user privacy and data use agreements with its customers, the entity's IP strategy (e.g., to remove information that may be a trade secret), privacy laws or regulations (e.g., the EU General Data Protection Regulation) determined to be relevant.

The data anonymizer 310 is communicatively coupled to obtain data (e.g., one or more of 232, 242, 244, 246, 252, and 262) and provide anonymized data. For example, the data anonymizer 310 may be communicatively coupled to one or more of the memory 204 and the data storage 214 to retrieve data (e.g., one or more of 232, 242, 244, 246, 252, and 262) and store an anonymized version of the data (not shown). As another example, the data anonymizer 310 may be communicatively coupled to one or more components or subcomponents of the end-to-end ML engine 228, such as the ML executer 314 to receive data (e.g., one or more of 232, 242, 244, 246, 252, and 262) therefrom and send anonymized data thereto.

The machine learning trainer 312 may include software and/or logic for training one or more of the machine learning models described herein. The machine learning trainer 312 is communicatively coupled to obtain a training data set, and is communicatively coupled to provide the machine learning model to the machine learning executer 314 for deployment. For example, the machine learning trainer 312 may be communicatively coupled to one or more of the memory 204, the data storage 214, and one or more components, or subcomponents, of the end-to-end ML engine 228.

The varieties of supervised, semi-supervised, and unsupervised machine learning algorithms that may be used, by the machine learning trainer 312, to train a machine learning model are so numerous as to defy a complete list. Example algorithms include, but are not limited to, a decision tree; a gradient boosted tree; boosted stumps; a random forest; a support vector machine; a neural network; a recurrent neural network; long short-term memory; transformer; logistic regression (with regularization), linear regression (with regularization); stacking; a Markov model; Markov chain; support vector machines; and others. Additionally, depending on the implementation, the various machine learning models trained, by the ML trainer 312, and deployed, by the ML executer 314, may or may not be based on a common algorithm or a common type of machine learning algorithm. For example, a second machine learning model for explaining a result of a first machine learning model may be a gradient boosted tree, in some implementations, and the first machine learning model may, or may not be, a gradient boosted tree and may, or may not, be supervised learning algorithm.

The machine learning trainer 312 receives training data and trains a machine learning model based on the training data. In some implementations, the machine learning trainer 312 may validate the machine learning model trained. For example, in some implementations, the machine learning trainer 312 receives training data, determines a subset of the training data as validation data, trains the machine learning model on the remaining test data, and validates the trained machine learning model using the validation data.

The machine learning deployment module 314 may include software and/or logic for deploying one or more of the machine learning models described herein. The machine learning deployment module 314 is communicatively coupled to obtain a machine learning model. For example, the machine learning deployment module 314 may be communicatively coupled to one or more of the memory 204, the data storage 214, and machine learning trainer 312 to receive or retrieve one or more of the machine learning models described here.

The machine learning deployment module 314 may be communicatively coupled to receive one or more of alerts 232, detection data 242 (or components 244/246 thereof), case management signal data 252, and consortium data 262 and apply one or more machine learning models to the received data. For example, the machine learning deployment module 314 may be communicatively coupled to one or more of the memory 204 and the data storage 214 to receive or retrieve one or more of alerts 232, detection data 242 (or components 244/246 thereof), case management signal data 252, and consortium data 262.

The alert receiver 306, case management signal data obtainer 308, the data anonymizer 310, ML trainer 312, and ML executer 314 of the end-to-end ML engine 228 may interact and cooperate to provide a variety of features and functionality depending on the implementation and used case. For clarity and convenience, some of the features and functionality are associated with, and described with reference to, the false-positive reducer 322, the alert balancer 324, the quality control engine 326, the bias eliminator, and the early warning engine 330.

The false-positive reducer 322 may include software and/or logic for reducing an incidence of false-positives and/or increasing a number of true-positives. An example implementation of a false positive reducer 322 is discussed with reference to FIG. 4. The alert balancer 324 may include software and/or logic for balancing alerts across users. An example implementation of an alert balancer 324 is discussed with reference to FIG. 5. The QC Engine 326 may include software and/or logic for performing quality control. An example implementation of an QC Engine 326 is discussed with reference to FIG. 6. The bias eliminator 328 may include software and/or logic for identifying and/or eliminating bias. An example implementation of a bias eliminator 328 is discussed with reference to FIG. 7. The early warning engine 330 may include software and/or logic for identifying emerging threats. An example implementation of an early warning engine 330 is discussed with reference to FIG. 8.

Referring to FIGS. 4-8, multiple instances of the alert receiver 306 (i.e., 306a-e), the case management signal data obtainer 308 (i.e., the 308a-e), the data anonymizer 310 (i.e., 310a-e), the ML trainer (i.e., 312a-j), and the ML executer 314 (i.e., 314a-j) are illustrated. Depending on the implementations, the instances a-j may be distinct instances, e.g., each instance is specialized and distinct instance to perform the task(s) or provide the features and functionality with described with reference to that instance below, or may refer to a common instance 306/308/310/312/314 executing a subset of software and/or logic to provide the features and functionality described below with reference to an instance a-j.

Figure 4:
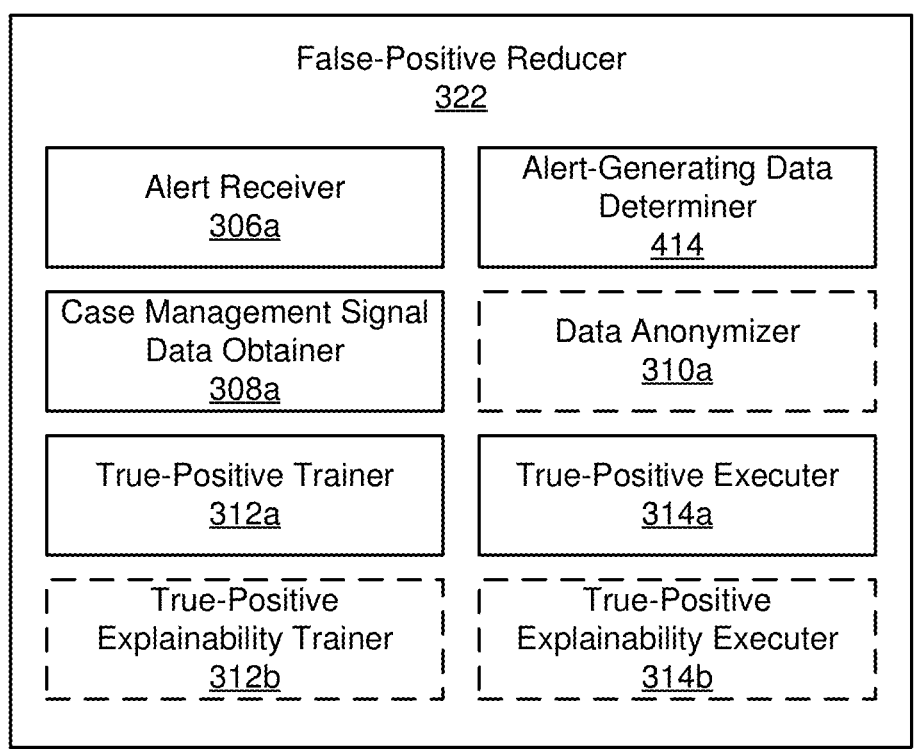
FIG. 4 illustrates a block diagram of an example false positive eliminator in accordance with some implementations.

Referring now to FIG. 4, a block diagram of an example false positive reducer 322 is illustrated in accordance with one implementation. As illustrated in FIG. 4, the false-positive reducer 322 may include an alert receiver 306a, an alert-generating data determiner 414, a case management signal data obtainer 308a, an optional data anonymizer 310a, a true-positive trainer 312a, a true-positive executer 314a, an optional true-positive explainability trainer 312b, and an optional true-positive explainability executer 314b.

The alert receiver 306a, the alert-generating data determiner 414, the case management signal data obtainer 308a, the optional data anonymizer 310a, the true-positive trainer 312a, the true-positive executer 314a, the optional true-positive explainability trainer 312b, and the optional true-positive explainability executer 314b may be communicatively coupled to one or more of each other, the memory 204, the data storage 214, or other components or subcomponents of the end-to-end machine learning engine 228.

For brevity, the description of the alert receiver 306, the case management signal data obtainer 308, and the data anonymizer 310, the ML trainer 312, and the ML executer are not duplicated with reference to the alert receiver 306a, the case management signal data obtainer 308a, the optional data anonymizer 310a, the true-positive trainer 312a, the true-positive executer 314a, the optional true-positive explainability trainer 312b, and the optional true-positive explainability executer 314b.

The alert receiver 306a obtains one or more alerts 232. The alert-generating data determiner 414 obtains the alert-generating data 244 associated with the one or more alerts 232 obtained by the alert receiver 306a. The case management signal data obtainer 308a obtains case management signal data 252 for the one or more cases associated with the one or more alerts 232 obtained by the alert receiver 306a. Optionally, one or more of the alerts 232, the alert-generating data 244, and the case management signal data 252 may be anonymized by the data anonymizer 310a to create an anonymized true-positive data set. Alternatively, depending on the implementation, the alerts 232, the alert-generating data 244, and the case management signal data 252 may remain un-anonymized.

The true-positive trainer 312a trains a true-positive model. Depending on the implementation, the algorithm and type of algorithm used to train the true-positive model may vary. The true-positive model reduces an incidence of false-positives and/or increases a number of true-positives. In some implementations, the true-positive model reduces an incidence of false-positives without increasing false-negatives.

Referring again to the example use case, in which the case may be closed or escalated to a point where no further information is available. Perhaps a criminal investigation began and resulted in a conviction, perhaps there was further investigation and the activity was benign or improper but deemed too insignificant to pursue further, perhaps the report was placed in a file and never looked at again, but that outcome is unavailable. Therefore, a ground truth of what is a true-positive, i.e., what activity that was flagged as suspicious via the alert(s) is indeed malfeasance, is unavailable to use, e.g., as a label, to train and improve the identification of suspicious activity by providing fewer false-positives and/or more true-positives.

Additionally, a relatively small percentage of alerts may generate cases that are escalated to the point where no further information becomes available (e.g., to the point a suspicious activity report is filed). For example, millions of transactions per day may be detected and evaluated for suspicious activity, but the number of SAR reports filed may be many orders of magnitude less (e.g., hundreds per year). Accordingly, using only the instances of suspicious activity that are associated with SAR report filings as true-positives to train a machine learning model may result in overfitting, which may fail to identify activity that should generate an alert, be investigated in a case, and be reported in a SAR (i.e., create false negatives).

Despite an unavailability of a ground-truth true-positive, the true-positive trainer 312a trains a true-positive model, which may reduce the number of false-positives while minimizing a risk of overfitting and creating an increase in false-negatives. In some implementations, the true-positive trainer 312a does this by training the true-positive model based on case management signal data 252.

In some implementations, the true-positive trainer 312a receives case management signal data trains the true-positive model based on the case management signal data 252. For example, the true-positive trainer 312a is communicatively couple to one or more of the memory 204, the data storage 214, and the other components (e.g., 306a/414/308a/310a) of the false positive reducer 322 to obtain data and information including, e.g., the case management signal data 252.

In some implementations, the true-positive trainer 312a trains the true-positive machine learning model in stages. For example, in some implementations, the true-positive trainer 312a trains a first true-positive machine learning model on a first set of training data, applies the first true-positive machine learning model to a second set of training data, and trains a second true-positive machine learning model, which may be provided to the true-positive executer 314a for deployment in an online environment (e.g., to generate alerts on incoming detection data 242, such as new transactions).

In some implementations in which the true-positive trainer 312a trains the true-positive machine learning model in stages, the true-positive trainer 312a trains a first true-positive model based on the case management signal data 252 and the alert-generating data 244. As this model is trained on the alert-generating data 244 and not the detection data 242, which includes both alert-generating data 244 and non-alert-generating data 246, the training set for the first true-positive model is unbalanced. Therefore, in some implementations, the first true-positive model is applied to the detection data 242 to generate a second set of true-positive training data. The true-positive trainer 312a trains a second true-positive model based on the second true-positive training set.

It should be understood that the alert-generating data 244 included in the first true-positive training data is a portion of the detection data 242, and the second set of true-positive training data includes that detection data 242. However, the subsets of the detection data 242 that is alert-generating data 244 and non-alert-generating 246 may have changed. To rephrase, what was alert-generating data 244 used to train the first true-positive model is unlikely to be the same as the alert-generating data 244 defined by application of the first true-positive model to the detection data 242, although the detection data 242 may remain the same.

The true-positive executer 314a is communicatively coupled to obtain the true-positive model and detection data 242. For example, the true-positive executer 314a may be communicatively coupled to one or more of the memory 204 and the data storage 214 to retrieve the true-positive model and detection data 242 therefrom.

The true-positive executer 314a applies a true-positive model trained by the true-positive trainer 312a. In some implementations, the true-positive executer 314a applies the true-positive model to new, incoming detection data 242 and generates new alerts, which may open cases, which are investigated, thereby generating new case management signal data 252.

In some implementations, the true-positive trainer 312a may retrain the true-positive model. Depending on the implementation, the retraining may be online, batch, mini-batch, etc.

Some implementations may explain a result (e.g., why an alert was generated). In some implementations, explainability may be a biproduct of training and deployment of the true-positive model. For example, in some implementations, the true-positive model may use Gradient Boosted Machine (GBM), or Gradient Boosted Trees (GBT); in some implementations, as the model is trained, or used, the features that maximize information gain, or minimize cross entropy loss, are used, e.g., presented, to explain a result. In some implementations, an optional true-positive explainability trainer 312b and executer 314b to train and apply an explainability algorithm distinct from the true-positive model. For example, the true-positive explainability trainer 312b obtains alerts 232 and the alert-generating data 244 associated with those alerts and trains an explainability model, which may be applied by the true-positive explainability executer 314b to explain a result, e.g., feature importance or the top X features that determined generation of the alert.

Figure 5:
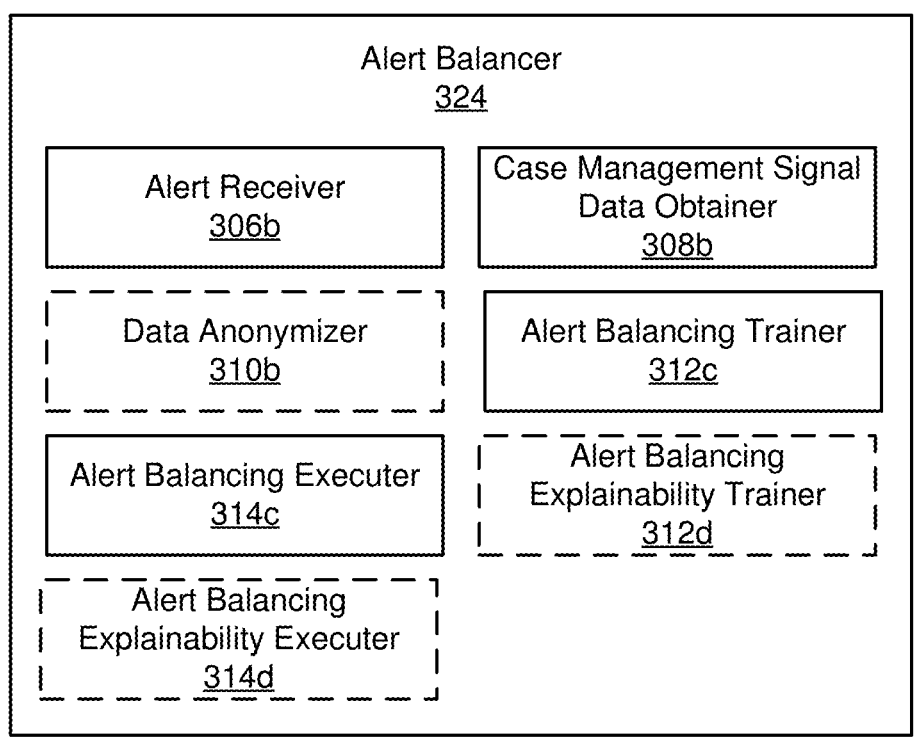
FIG. 5 illustrates a block diagram of an example alert balancer in accordance with some implementations.

Referring now to FIG. 5, a block diagram of an example alert balancer 324 is illustrated in accordance with some implementations. As illustrated in FIG. 5, the alert balancer 324 may include an alert receiver 306b, a case management signal data obtainer 308b, an optional data anonymizer 310b, an alert balancing trainer 312c, an alert balancing executer 314c, an optional alert balancing explainability trainer 312d, and an optional alert balancing explainability executer 314d.

The alert receiver 306b, the case management signal data obtainer 308b, the optional data anonymizer 310b, the alert balancing trainer 312c, the alert balancing executer 314c, the optional alert balancing explainability trainer 312d, and the optional alert balancing explainability executer 314d may be communicatively coupled to one or more of each other, the memory 204, the data storage 214, or other components or subcomponents of the end-to-end machine learning engine 228.

For brevity, the description of the alert receiver 306, the case management signal data obtainer 308, and the data anonymizer 310, the ML trainer 312, and the ML executer 314 are not duplicated with reference to the alert receiver 306b, the case management signal data obtainer 308b, the optional data anonymizer 310b, the alert balancing trainer 312c, the alert balancing executer 314c, the optional alert balancing explainability trainer 312d, and the optional alert balancing explainability executer 314d.

The alert receiver 306 obtains one or more alerts 232. The case management signal data obtainer 308b obtains case management signal data 252 for the one or more cases associated with the one or more alerts 232 obtained by the alert receiver 306b. Optionally, one or more of the alerts 232, the alert-generating data 244, and the case management signal data 252 may be anonymized by the data anonymizer 310b to create an anonymized training data set. Alternatively, depending on the implementation, the alerts 232, the alert-generating data 244, and the case management signal data 252 may remain un-anonymized.

The alert balancing trainer 312c trains an alert balancing model. Depending on the implementation, the algorithm and type of algorithm used to train the alert balancing model may vary. The alert balancing model, when deployed by the alert balancing executer 314c, may balance the alerts and/or the cases associated with those alerts among the case managers, e.g., based on a case manager's workload and expected time needed to complete case(s).

In some implementations, the alert balancing trainer 312c receives case management signal data 252 and alerts 232, and trains the alert balancing model based on the case management signal data 252 and alerts 232. For example, the alert balancing trainer 312c is communicatively couple to one or more of the memory 204, the data storage 214, and the other components (e.g., 306b/308b/310b) of the alert balancer 324 to obtain data and information including, e.g., the case management signal data 252 and the associated alerts 232.

For example, consider a scenario in which a "terrorist financing" alert and a "structuring" alert exist, where structuring is a form of money laundering, and a "structuring" case generally takes longer and/or is more likely to be escalated to a SAR filing (e.g., because it's not uncommon for the "terrorist financing" case to involve a person who shares his/her name with a person on the terrorist watchlist that is readily verifiable, or whatever the reason). The case management signal data 252 may reflect that difference. For example, cases involving the "terrorist financing" alert may be statistically more likely to be closed quickly after opening, without escalation, and with little comment and cases of "structuring" by contrast may be statistically more likely to be escalated at least once, have a greater amount of commentary, and be open for longer prior to escalation or closure, which, in some implementations, is represented in the case management signal data 252. It should be recognized that the foregoing is a non-limiting example and that alerts 232 and case management signal data 252 are not limited to the example above.

The alert balancing trainer 312c trains the alert balancing model based on the case management signal data 252, which, when applied by the alert balancing executer 314c, assigns alerts and/or cases in a time-balanced manner, which decreases the likelihood of scenarios where a first case manager is inadvertently assigned too many time-intensive cases to complete in timely manner and too many brief cases to a second case manager so the second case manager is idle and underutilized.

The alert balancing executer 314c is communicatively coupled to obtain the case management signal data 252 and associated alerts 232. For example, the alert balancing executer 314c may be communicatively coupled to one or more of the memory 204 and the data storage 214 to retrieve the case management signal data 252 and associated alerts 232 therefrom.

The alert balancing executer 314c applies an alert balancing model trained by the alert balancing trainer 312c. In some implementations, the alert balancing executer 314c applies the alert balancing model to new, incoming alerts 232, or cases associated therewith, and assigns the alerts, or the cases associated therewith, to case managers.

In some implementations, the alert balancing trainer 312c may retrain the alert balancing model. Depending on the implementation, the retraining may be online, batch, mini-batch, etc.

Some implementations may explain a result. In some implementations, explainability may be a biproduct of training and deployment of the alert-balancing model. For example, in some implementations, the alert balancing model may use Gradient Boosted Machine (GBM) or Gradient Boosted Trees (GBT); in some implementations, as the model is trained, or used, the features that maximize information gain, or minimize cross entropy loss, are used, e.g., presented, to explain a result. In some implementations, an optional alert balancing explainability trainer 312d and executer 314d to train and apply an explainability algorithm distinct from the alert balancing model. For example, the alert balancing explainability trainer 312d obtains alerts 232 and the alert-generating data 244 associated with those alerts and trains an explainability model, which may be applied by the alert balancing explainability executer 314d to explain a result, e.g., feature importance or the top X features that determined a result (e.g., assignment of an alert or case to a case manager).

Figure 6:
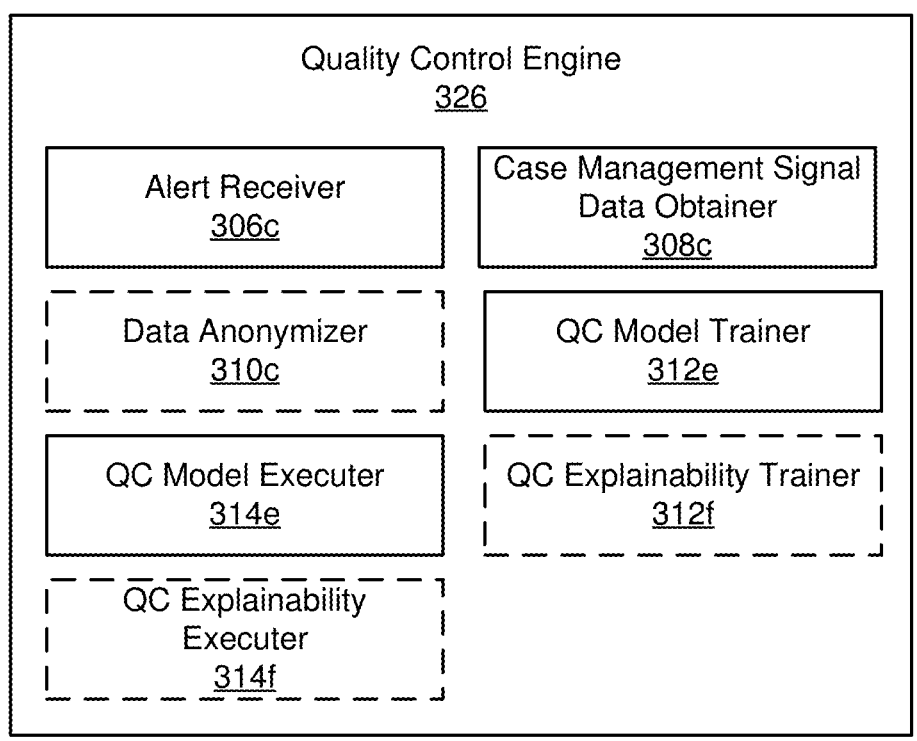
FIG. 6 illustrates a block diagram of an example quality control engine in accordance with some implementations.

Referring now to FIG. 6, a block diagram of an example quality control (QC) engine 326 is illustrated in accordance with some implementations. As illustrated in FIG. 6, the quality control engine 326 may include an alert receiver 306c, a case management signal data obtainer 308c, an optional data anonymizer 310c, a QC model trainer 312e, a QC model executer 314e, an optional QC explainability trainer 312f, and an optional QC explainability executer 314f.

The alert receiver 306c, the case management signal data obtainer 308c, the optional data anonymizer 310c, the QC model trainer 312e, the QC model executer 314e, the optional QC explainability trainer 312f, and the optional QC explainability executer 314f may be communicatively coupled to one or more of each other, the memory 204, the data storage 214, or other components or subcomponents of the end-to-end machine learning engine 228.

For brevity, the description of the alert receiver 306, the case management signal data obtainer 308, and the data anonymizer 310, the ML trainer 312, and the ML executer 314 are not duplicated with reference to alert receiver 306c, the case management signal data obtainer 308c, the optional data anonymizer 310c, the QC model trainer 312e, the QC model executer 314e, the optional QC explainability trainer 312f, and the optional QC explainability executer 314f.

The alert receiver 306c obtains one or more alerts 232. The case management signal data obtainer 308c obtains case management signal data 252 for the one or more cases associated with the one or more alerts 232 obtained by the alert receiver 306c. Optionally, one or more of the alerts 232, the alert-generating data 244, and the case management signal data 252 may be anonymized by the data anonymizer 310c to create an anonymized training data set. Alternatively, depending on the implementation, the alerts 232, the alert-generating data 244, and the case management signal data 252 may remain un-anonymized.

The QC model trainer 312e trains a QC model. Depending on the implementation, the algorithm and type of algorithm used to train the QC model may vary. In some implementations, multiple QC models may be trained. For example, in some implementations, a first type of QC model may identify high-performers, attributes of high performers, and a second type of QC model may identify strengths of case managers and assign alerts and/or cases that play to individual case manager's strength(s).

The QC model, when deployed by the QC model executer 314e, may infer case manager performance and/or strengths/weaknesses from the case management signal data. For example, when the case management signal data indicates that all cases escalated from a first case agent are immediately closed by a supervisor, and the supervisor does not close all cases from a second case manager, the QC model may infer that the first case agent is underperforming. In another example, when the case management signal data 252 indicates that a supervisor escalates a higher percentage of "structuring" cases from a first case agent than from other case agents and spends less time before escalating, it may indicate that "structuring" cases are a strength of the first case agent.

In some implementations, after a QC model is trained to identify strengths and weaknesses, e.g., of individual case managers, departments, or the entity as a whole, the QC model trainer 312e may train a model to identify common features among high, or low, performers. In some implementations, the QC model trainer 312e may access personnel information about case managers. For example, the QC model trainer 312e may access personnel files to identify a case manager's alma mater, educational background, prior work experience, supervisor, trainer, supervisor, department, office, location, seniority, start date, prior positions, etc. In some implementations, personal information (not shown) may be stored in the memory 204 or data storage 214 and retrieved therefrom. For example, the personnel information may be stored in a personnel file or obtained from a public social networking profile (e.g., LinkedIn) depending on the implementation.

Accordingly, in some implementations, the QC model may surface information useful for employee recruitment, advancement, or retention, and make recommendations. For example, the QC model may reveal that many of the high performers have a similar degree from a common institution, and recommend hiring graduates from that program at that institution is recommended, or that the high performers were all trained by the same person or are in the same office and that individual/office should be assigned additional trainees, or that employee X is significantly underperforming his/her peers and should be considered for retraining or termination.

In some implementations, the alert balancing trainer 312c may train the alert balancing model based on strengths. For example, the alert balancing model when deployed, balances case load based on time (i.e., assigning cases to balance the work load across case managers) and ability (i.e., assigning cases to those most qualified or able to handle efficiently). Efficiency may be defined in different ways depending on the implementation. Examples include, but are not limited to, a likelihood of escalation (e.g., a first escalation or to a SAR) and ratio of likelihood of escalation (e.g., a first escalation or to a SAR) to an expected time input by the case manager.

In some implementations, the QC model trainer 312e receives case management signal data 252 and trains the QC model(s) based on the case management signal data 252. For example, the QC model trainer 312e is communicatively couple to one or more of the memory 204, the data storage 214, and the other components (e.g., 306c/308c/310c) of the QC engine 326 to obtain data and information including, e.g., the case management signal data 252.

The QC model executer 314e is communicatively coupled to obtain the QC model and, in some implementations, new/incoming alerts 232. For example, the QC model executer 314e may be communicatively coupled to one or more of the memory 204 and the data storage 214 to retrieve the QC model and, in some implementations, new/incoming alerts therefrom.

The QC model executer 314e applies a QC model trained by the QC model trainer 312e. In some implementations, the QC model executer 314e applies the QC model to new, incoming detection alerts, which may open cases, to assign the new cases among case managers.

In some implementations, the QC model trainer 312e may retrain the QC model(s). Depending on the implementation, the retraining may be online, batch, mini-batch, etc.

Some implementations may explain a result (e.g., why an alert was generated). In some implementations, explainability may be a biproduct of training and deployment of the QC model. For example, in some implementations, the QC model may use Gradient Boosted Machine (GBM), or Gradient Boosted Trees (GBT); in some implementations, as the model is trained, or used, the features that maximize information gain, or minimize cross entropy loss, are used, e.g., presented, to explain a result. In some implementations, an optional QC explainability trainer 312f and executer 314f to train and apply an explainability algorithm distinct from the QC model. For example, the QC explainability trainer 312f obtains case management signal data 252 and trains an explainability model, which may be applied by the QC explainability executer 314f to explain a result, e.g., feature importance or the top X features that determined a result.

Figure 7:
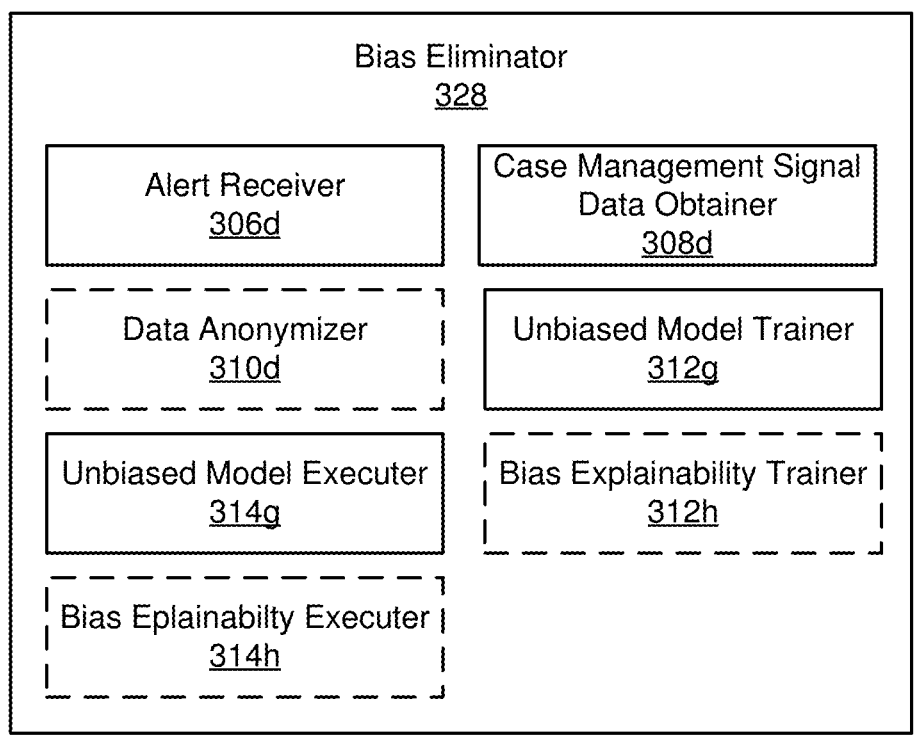
FIG. 7 illustrates a block diagram of an example bias determiner in accordance with some implementations.

Referring now to FIG. 7, a block diagram of an example bias eliminator 328 is illustrated in accordance with some implementations. As illustrated in FIG. 7, the bias eliminator 328 may include an alert receiver 306d, a case management signal data obtainer 308d, an optional data anonymizer 310d, an unbiased model trainer 312g, a unbiases model executer 314g, an optional bias explainability trainer 312h, and an optional bias explainability executer 314h.

The alert receiver 306d, the case management signal data obtainer 308d, the optional data anonymizer 310d, the unbiased model trainer 312g, the unbiased model executer 314g, the optional bias explainability trainer 312h, and the optional bias explainability executer 314h may be communicatively coupled to one or more of each other, the memory 204, the data storage 214, or other components or subcomponents of the end-to-end machine learning engine 228.

For brevity, the description of the alert receiver 306, the case management signal data obtainer 308, and the data anonymizer 310, the ML trainer 312, and the ML executer 314 are not duplicated with reference to the case management signal data obtainer 308d, the optional data anonymizer 310d, the unbiased model trainer 312g, the unbiased model executer 314g, the optional bias explainability trainer 312h, and the optional bias explainability executer 314h.

The alert receiver 306d obtains one or more alerts 232. The case management signal data obtainer 308d obtains case management signal data 252 for the one or more cases associated with the one or more alerts 232 obtained by the alert receiver 306a. Optionally, one or more of the alerts 232, the detection data 242, and the case management signal data 252 may be anonymized by the data anonymizer 310d to create an anonymized training data set. Alternatively, depending on the implementation, the alerts 232, the detection data 242, and the case management signal data 252 may remain un-anonymized.

The unbiased model trainer 312g trains an unbiased model. Depending on the implementation, the algorithm and type of algorithm used to train the unbiased model may vary. Depending on the implementation, the unbiased model may identify or reduce effects of bias. In some implementations, the bias identified or reduced may be in one or more of the alerts generated, the cases opened, or the handling of the cases by case managers. The bias may include one or more of an institutional bias (e.g., due to the policies of a particular bank), a personal bias (e.g., a case manager's prejudice), bias toward a protected class, bias toward a type activity or case.

In some implementations, the unbiased model trainer 312g obtains, for training, the alerts 232 and the case management signal data 252 by obtaining consortium data 262 including the alerts 232 and case management signal data 252. In some implementations, the consortium data 262 is anonymized to remove personally identifiable information, but may include protected class information (e.g., race, religion, color, national origin, age, physical disability, mental handicap, sex) of associated parties (e.g., parties to a transaction). In some implementations, the consortium data may include detection data 242.

In one implementation, the unbiased model trainer 312g samples the consortium data 262 to select data associated with each tenant/entity that contributed to the consortium data. For example, the unbiased model trainer 312g samples the consortium data 262 to obtain samples from every bank, credit union, brokerage, or other financial institution. In some implementations, the unbiased model trainer 312g determines a number of samples from each tenant based on one or more fairness metrics. Examples of fairness metrics may include, but are not limited to, a size of company, a period of time the tenant has been contributing to the consortium data, etc. The fairness metrics avoids oversampling large and/or long-term tenants and undersampling small and/or recent tenants, which may bias, or influence, the results of the unbiased model training. In some implementations, the samples describe both instances where an alert was generated and instances that did not generate an alert.

In some implementations, the unbiased model trainer 312g, using the samples obtained from the consortium data based on the fairness metrics, the performs fairness coefficient learning process to determine a weight of the loss function for each prediction in order to arrive with an unbiased classifier. In some implementations, the fairness coefficient learning process includes (1) defining a protected group, such as a protected class, (2) running a prediction on the protected group and the overall population, (3) when the positive prediction rate for a protected group is lower than the overall positive prediction rate for the overall population, then the corresponding co-efficient is increased, or when the positive prediction rate for a protected group is higher than the overall positive prediction rate for the overall population, the corresponding co-efficient is decreased, (4) when the positive prediction rate for a protected group matches the overall positive prediction rate for the overall population, the unbiased coefficient for that protected group is learned, (5) the initial biased dataset labels (i.e., labels in the consortium data set) are weighted with the unbiased coefficient, and a model (e.g. to identify suspicious activity and generate an alert) is retrained, which results in unbiased classifier. For example, the unbiased model trainer 312g trains an unbiased model that is an unbiased classifier for classifying detected data as suspicious activity, in which event an alert is generated, or not suspicious activity.

In some implementations, the unbiased model trainer 312g train an unbiased model that assigns a case to an unbiased, or less biased, case manager. For example, the unbiased model trainer 312g trains a model, based on the case management data signal data 252 and a protected class information, and that model may route a case to an unbiased case manager. For example, the unbiased model, when applied, may reveal that case manager A has a bias to immediately close a particular kind of case his/her escalated cases are highly correlated with a protected class, e.g., when compared to other case managers, and in some implementations, route future cases of that kind or involving that protected class to other another case manager and/or flag case manager A for additional training or counseling to discuss and address the bias.

The unbiased model executer 314g is communicatively coupled to obtain the true-positive training model and detection data 242. For example, the unbiased model executer 314g may be communicatively coupled to one or more of the memory 204 and the data storage 214 to retrieve the unbiased training model and detection data 242 therefrom.

The unbiased model executer 314g applies the unbiased model trained by the unbiased model trainer 312g. In some implementations, the unbiased model executer 314g applies the true-positive model to new, incoming detection data 242 and generates new alerts, which may open cases, which are investigated, thereby generating new case management signal data 252.

In some implementations, the unbiased model trainer 312g may retrain the unbiased model. Depending on the implementation, the retraining may be online, batch, mini-batch, etc.

Some implementations may explain a result. In some implementations, explainability may be a biproduct of training and deployment of the unbiased model. For example, in some implementations, the unbiased model may use Gradient Boosted Machine (GBM), or Gradient Boosted Trees (GBT); in some implementations, as the model is trained, or used, the features that maximize information gain, or minimize cross entropy loss, are used, e.g., presented, to explain a result. In some implementations, an optional bias explainability trainer 312h and executer 314h to train and apply an explainability algorithm distinct from the unbiased model.

Figure 8:
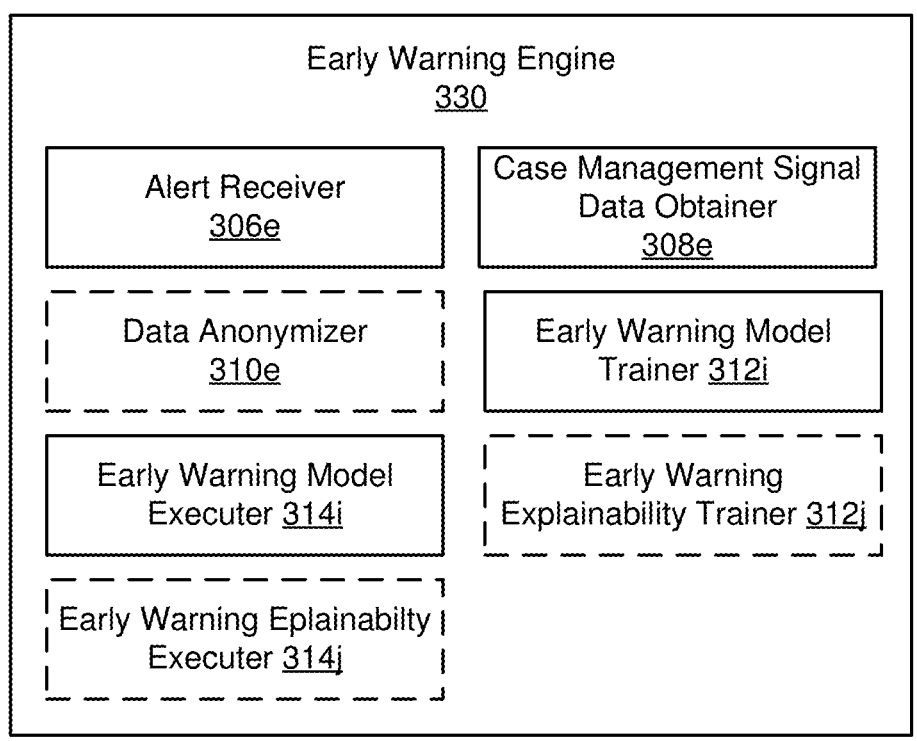
FIG. 8 illustrates a block diagram of an example early warning engine in accordance with some implementations.

Referring now to FIG. 8, a block diagram of an example early warning engine 330 is illustrated in accordance with some implementations. As illustrated in FIG. 7, the early warning engine 330 may include an alert receiver 306e, a case management signal data obtainer 308e, an optional data anonymizer 310e, an early warning model trainer 312i, an early warning model executer 314i, an optional early warning explainability trainer 312j, and an optional early warning explainability executer 314j.

The alert receiver 306e, the case management signal data obtainer 308e, the optional data anonymizer 310e, the early warning model trainer 312i, the early warning model executer 314i, the optional early warning explainability trainer 312j, and the optional early warning explainability executer 314j may be communicatively coupled to one or more of each other, the memory 204, the data storage 214, or other components or subcomponents of the end-to-end machine learning engine 228.

For brevity, the description of the alert receiver 306, the case management signal data obtainer 308, and the data anonymizer 310, the ML trainer 312, and the ML executer are not duplicated with reference to the alert receiver 306e, the case management signal data obtainer 308e, the optional data anonymizer 310e, the early warning model trainer 312i, the early warning model executer 314i, the optional early warning explainability trainer 312j, and the optional early warning explainability executer 314j.

The alert receiver 306e obtains one or more alerts 232. The case management signal data obtainer 308e obtains case management signal data 252 for the one or more cases associated with the one or more alerts 232 obtained by the alert receiver 306e. Optionally, one or more of the alerts 232, the alert-generating data 244, and the case management signal data 252 may be anonymized by the data anonymizer 310e to create an anonymized training data set. Alternatively, depending on the implementation, the alerts 232, the alert-generating data 244, and the case management signal data 252 may remain un-anonymized.

The early warning model trainer 312i trains an early warning model. Depending on the implementation, the algorithm and type of algorithm used to train the early warning model may vary. The early warning model detects trends in an earlier time-zone using machine learning and adjusts one or more machine learning models.

In some implementations, the early warning model trainer 312i receives one or more of recent alerts 232 and recent case management signal data 252 and trains the early warning model based on one or more of recent alerts 232 and recent case management signal data 252. The early warning model may be more easily understood with reference to an example. Banks in Asia are in an earlier time zone than banks in Europe, which are in an earlier time zone than banks in the Americas. Accordingly, alerts of suspicious activity during business hours in Asia may be indicative of suspicious activity to be expected when banks open in Europe, or in later in the Americas, and suspicious activity during business hours in the Americas may be indicative of that to be expected in Asia the next day.

In some implementations, early warning model trainer 312i obtains a set of recent alert-generating data 244. Recent may vary based on the implementation, e.g., the set of recent alert-generating data 244 may be the alert-generating data 244 associated with the X most recently received alerts, or associated with alerts received in the last Y minutes, hours, days. The early waring model trainer 312i trains an early warning model to identify any commonalities in the alert-generating data 244 to rapidly identify a trend. For example, the early warning model may identify a pattern where alerts are associated with a common geographic location or IP address, which may indicate a new server farm from which a bad actor is performing suspicious activity, or that a large number of customers of a particular institution are associated with alerts for suspicious activity, which may indicate that institution was hacked.

In some implementations, the trend is presented to other entities and/or their alert generating machine learning models may be updated based on the early warning model.

The early warning model executer 314i is communicatively coupled to obtain the early warning model and detection data 242. For example, the early warning model executer 314i may be communicatively coupled to one or more of the memory 204 and the data storage 214 to retrieve the early warning model and detection data 242 therefrom.

The true-positive executer 314a applies early warning model trained by the early warning model trainer 312i. In some implementations, the early warning model executer 314i applies the early warning model to new, incoming detection data 242 and generates new alerts, which may better identify the trending suspicious activity.

In some implementations, the early warning model trainer 312i may retrain the early warning model. Depending on the implementation, the retraining may be online, batch, mini-batch, etc.

Some implementations may explain a result. In some implementations, explainability may be a biproduct of training and deployment of the true-positive model. For example, in some implementations, the early warning model may use Gradient Boosted Machine (GBM), or Gradient Boosted Trees (GBT); in some implementations, as the model is trained, or used, the features that maximize information gain, or minimize cross entropy loss, are used, e.g., presented, to explain a result. In some implementations, an optional early warning explainability trainer 312j and executer 314j to train and apply an explainability algorithm distinct from the early warning model.

It should be recognized that while various features and functionalities have been discussed separately with reference to FIGS. 4-8, the features, functionalities, and models are not necessarily discreet and may be combined in some implementations. In some implementations, a model is trained using based on the description of more than one of FIGS. 4-8. For example, the detection data 242 may be sampled using the fairness metrics to generate a training set, e.g., as described with reference to the bias eliminator 328, that training set may then be supplemented with case management signal data 252 and used to train the first and second true positive models, as described with reference to false-positive reducer 322, and the fairness coefficients may be trained for the second true-positive model to create an unbiased true positive model. In some implementations, one or more models may be ensembled. For example, the true-positive model may be ensembled with the early warning model.

Example Methods

FIGS. 9-12 are flowcharts of example methods 900-1200 that may, in accordance with some implementations, be performed by the systems described above with reference to FIGS. 1-8. The methods 900, 1000a, 1000b, 1006, and 1200 of FIGS. 9-12 are provided for illustrative purposes, and it should be understood that many variations exist and are within the scope of the disclosure herein.

Figure 9:
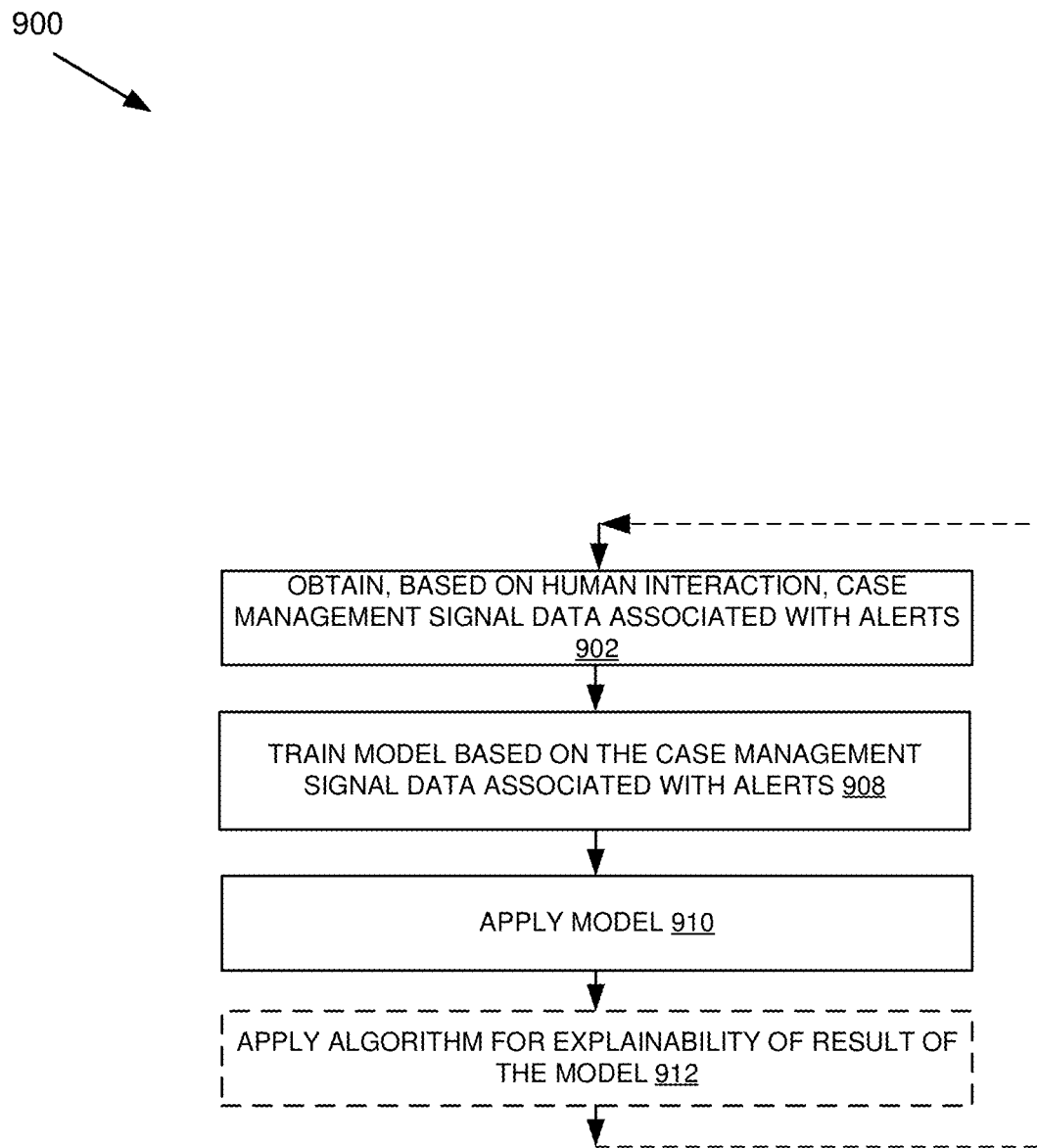
FIG. 9 illustrates a flowchart of an example method for end-to-end machine learning in accordance with some implementations.

FIG. 9 illustrates a flowchart of an example method 900 for end-to-end machine learning in accordance with some implementations. The method 900 begins at block 902. At block 902, the case management signal data obtainer 308 obtains, based on human interaction, case management signal data associated with alerts. At block 908, the ML trainer 312 trains a model based on the case management signal data associated with alerts. At block 910, the ML executer 914 applies the model trained at block 908. Optionally, at block 912, the ML executer 914 applies an algorithm for explainability of result of the model applied at block 910.

Figure 10A:
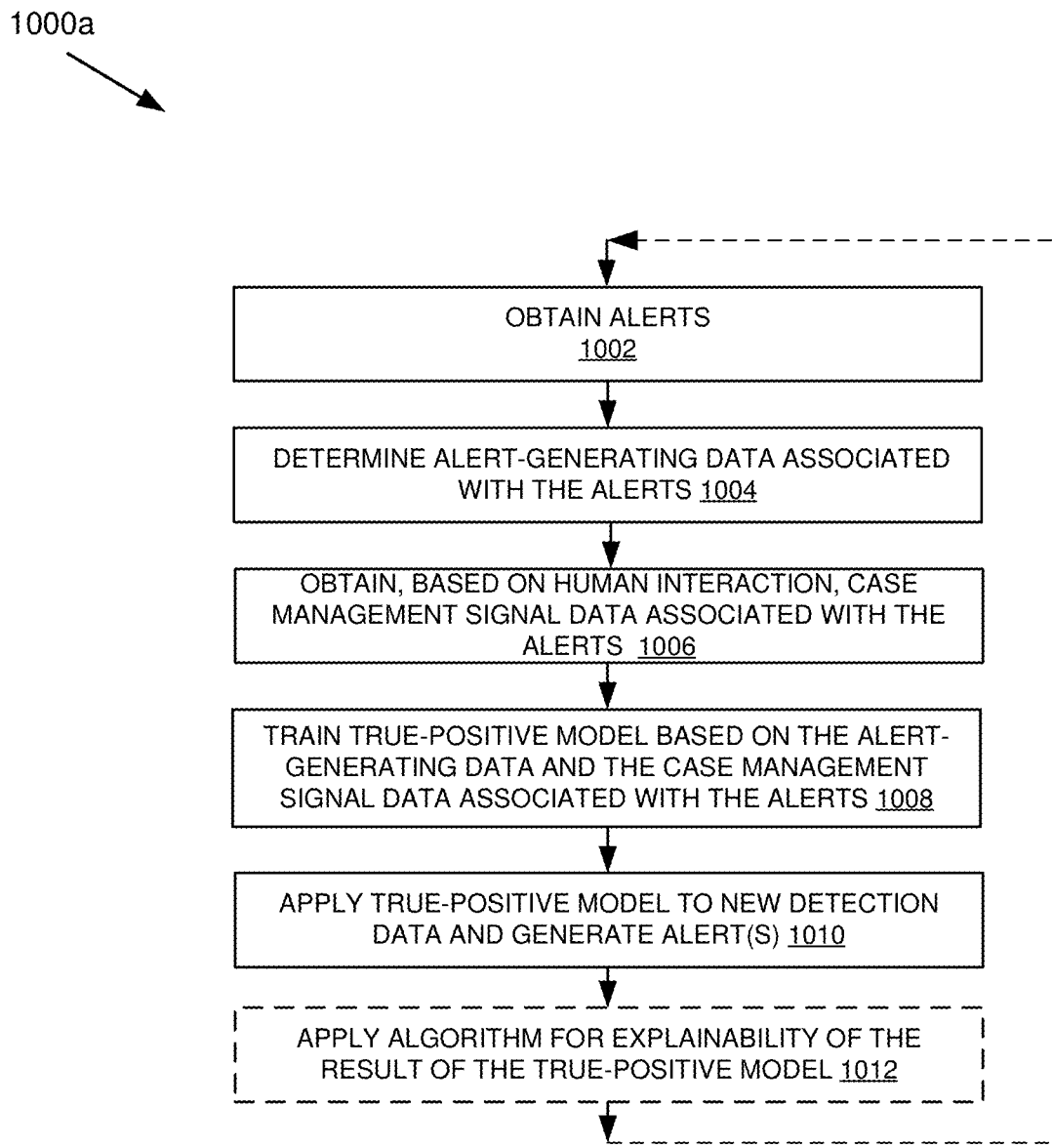
FIGS. 10a and 10b illustrate flowcharts of example methods for reducing false positives in accordance with some implementations.

FIG. 10a is a flowchart of an example method 1000a for reducing false positives in accordance with some implementations. The method 1000a begins at block 1002. At block 1002, the alert receiver 306a obtains alerts 232. At block 1004, the alert-generating data determiner 414 determines alert-generating data 244 associated with the alerts 232 received at block 1002. At block 1006, the case management signal data obtainer 308a obtains, based on human interaction, case management signal data 252 associated with the alerts 232 received at block 1002. At block 1008, the true-positive trainer 312a trains a true-positive model based on the alert-generating data 244 and the case management signal data 252 associated with the alerts 232. At block 1010, the true-positive executer 314a applies the true-positive model, trained at block 1008, to new detection data and generates one or more alerts 232. At block 1012, the true-positive executer 314a applies an algorithm for explainability of the result of the true-positive model. Blocks 1002-1012 may be repeated, e.g., to train, or retrain, the true-positive model to produce alerts with fewer false-positives.

Figure 10B:
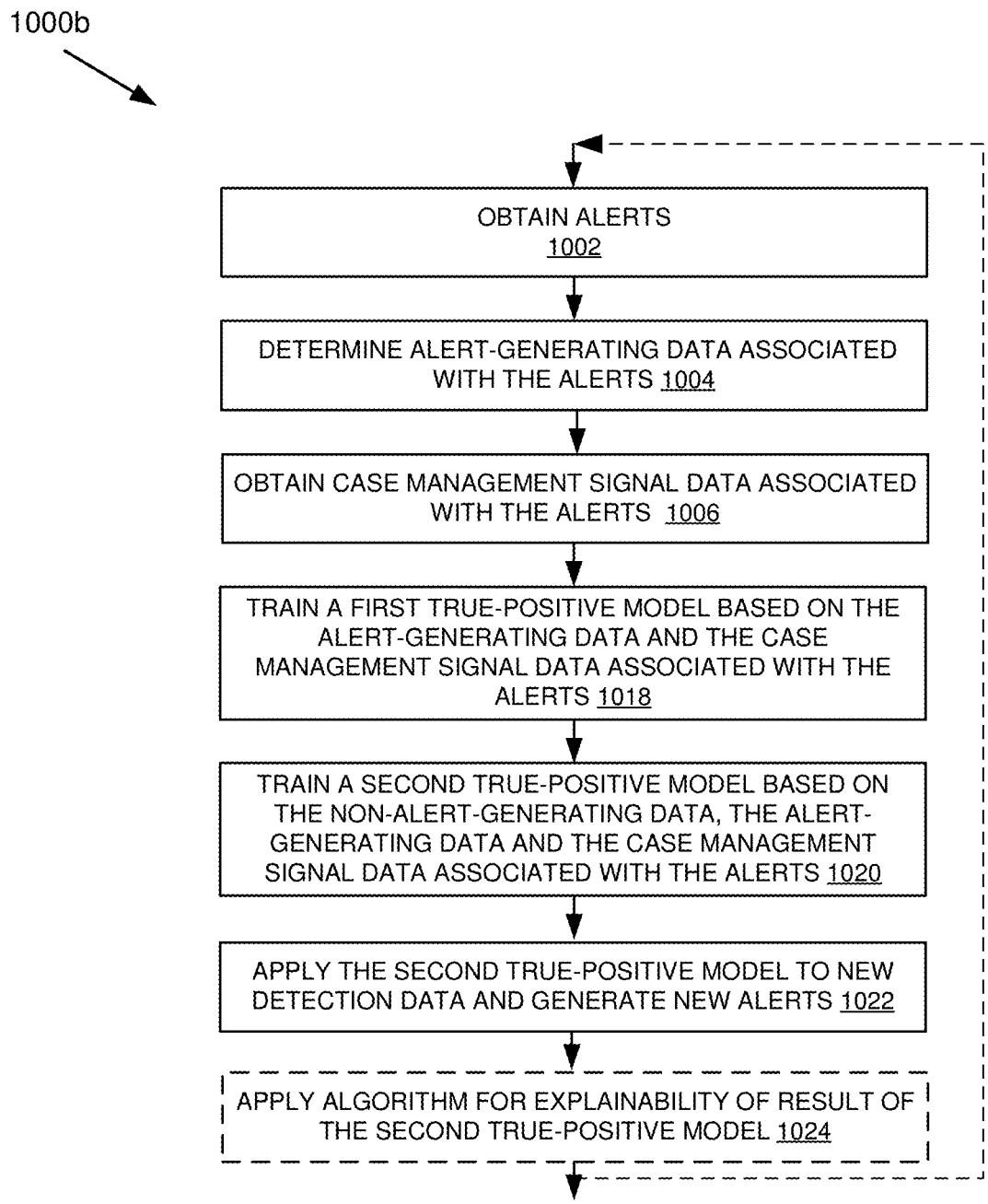

FIG. 10b is a flowchart of another example method 1000b for reducing false positives in accordance with some implementations. The method 1000b begins at block 1002. At block 1002, the alert receiver 306a obtains alerts 232. At block 1004, the alert-generating data determiner 414 determines alert-generating data 244 associated with the alerts 232 received at block 1002. At block 1006, the case management signal data obtainer 308a obtains, based on human interaction, case management signal data 252 associated with the alerts 232 received at block 1002. At block 1018, the true-positive trainer 312a trains a first true-positive model based on the alert-generating data and the case management signal data associated with the alerts. At block 1020, the true-positive trainer 312a trains a second true-positive model based on the non-alert generating data, the alert generating data, and the case management signal data associated with the alerts received at block 1002. At block 1022, the true-positive executer 314a applies the second true-positive model, trained at block 1020, to new detection data 242 (e.g., new transactions) and generates one or more alerts 232. At block 1024, the true-positive executer 314a applies an algorithm for explainability of the result of the second true-positive model. Blocks 1002-1024 may be repeated, e.g., to train, or retrain, the second true-positive model to produce alerts with fewer false-positives.

Figure 11:
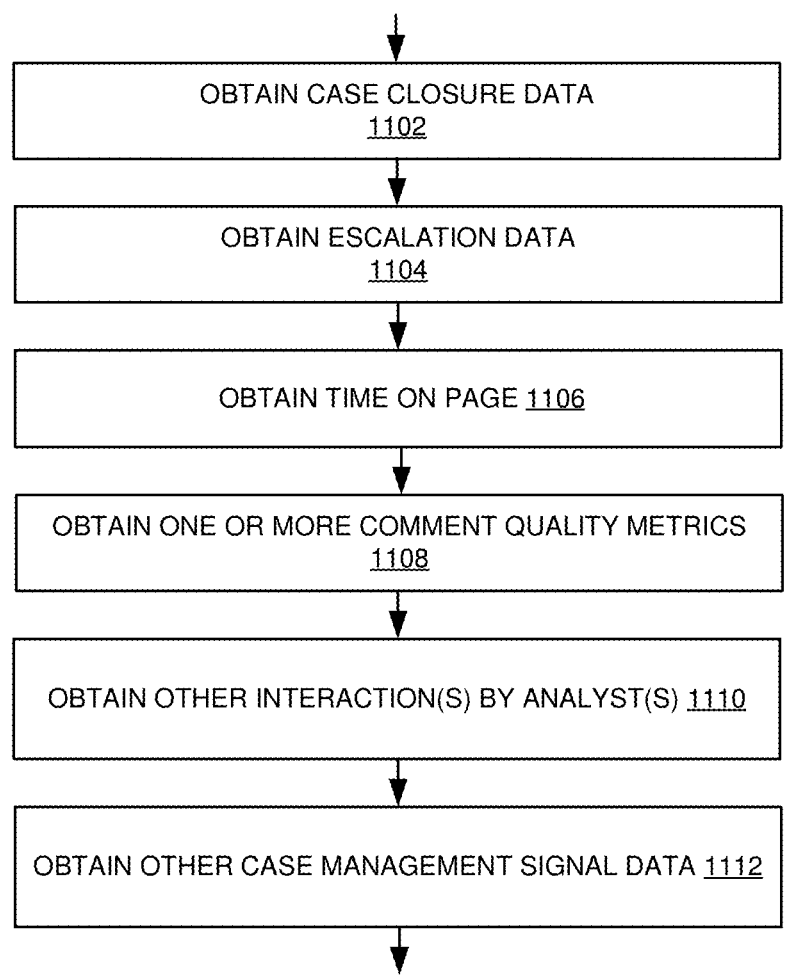
FIG. 11 illustrates a flowchart of an example method for obtaining case management signal data in accordance with some implementations.

FIG. 11 is a flowchart of an example method 1006 for obtaining case management signal data in accordance with some implementations. At block 1102, the case management signal data obtainer 308 obtains case closure data. At block 1104, the case management signal data obtainer 308 obtains escalation data. At block 1106, the case management signal data obtainer 308 obtains time on page. At block 1108, the case management signal data obtainer 308 obtains one or more comment quality metrics. At block 1110, the case management signal data obtainer 308 obtains other interaction(s) by the analyst(s). At block 1112, the case management signal data obtainer 308 obtains other case management signal data.

Figure 12:
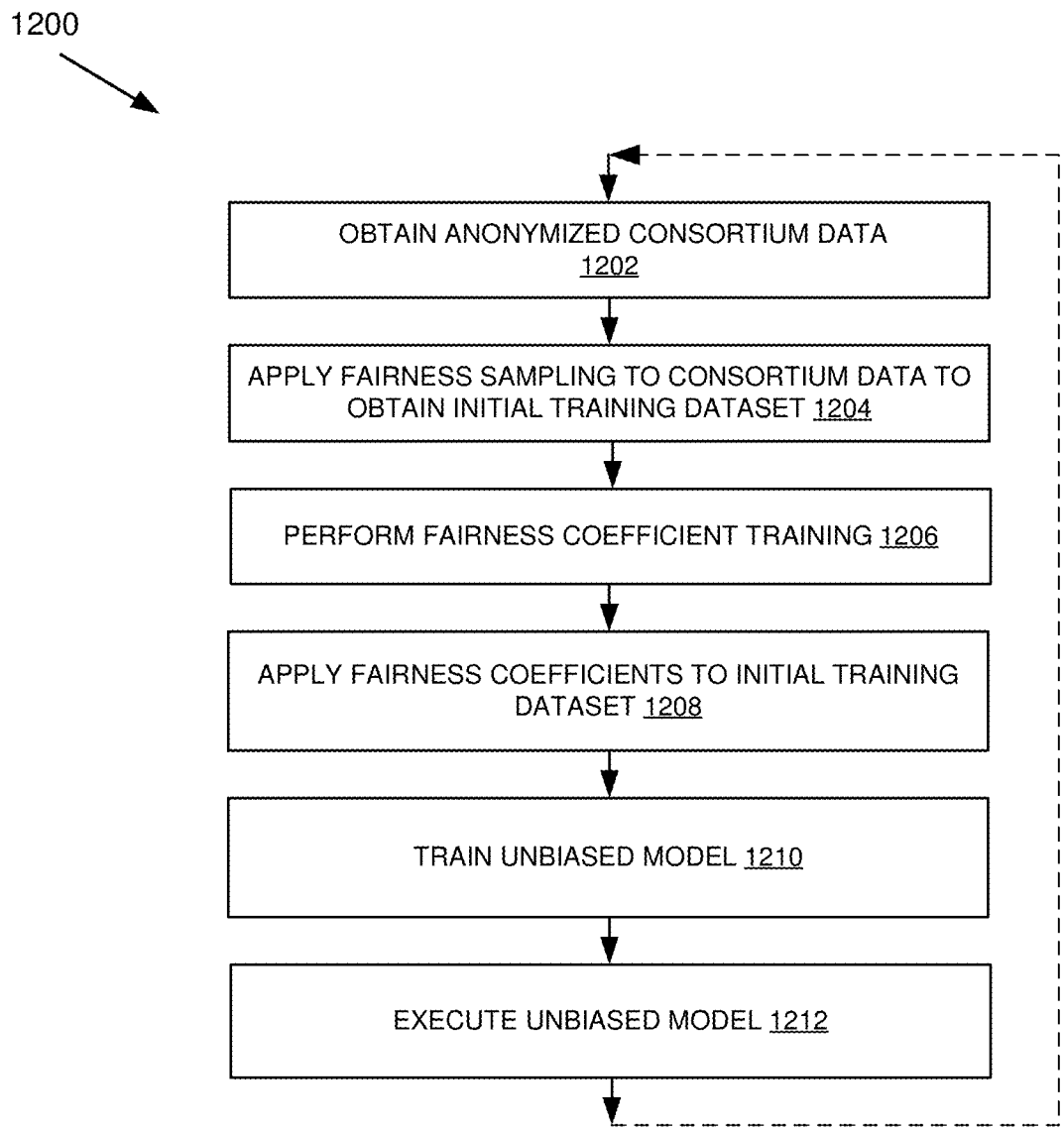
FIG. 12 illustrates a flowchart of an example for eliminating bias in accordance with some implementations.

FIG. 12 is a flowchart of an example method 1200 for eliminating bias in accordance with some implementations. At block 1202, the unbiased model trainer 312g obtains anonymized consortium data. At black 1204, the unbiased model trainer 312g applies fairness sampling to the anonymized consortium data to obtain an initial training dataset. At block 1206, the unbiased model trainer 312g performs fairness coefficient training. At block 1208, the unbiased model trainer 312g trains an unbiased model. At block 1212, the unbiased model executer 314g executes the unbiased model trained at block 1210.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web- Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
   obtaining, using one or more processors, consortium data including case management signal data from a plurality of entities, wherein the case management signal data is associated with a plurality of alerts, the case management signal data anonymized and based on human interaction;
   generating, using the one or more processors, an unbiased training data set using fairness sampling of the consortium data from the plurality of entities;
   performing a fairness coefficient training based on the unbiased training data set;
   applying one or more fairness coefficients to the unbiased training data set;
   training, using the one or more processors, a first model based on the unbiased training data set with the one or more fairness coefficients applied, the unbiased training data set including a subset of case management signal data, the subset of case management signal data associated with the one or more alerts; and
   generating, using the one or more processors, a result including one or more new alerts based on the first model.

2. The computer implemented method of claim 1, wherein the one or more new alerts are associated with a reduced incidence of false positives.

3. The computer implemented method of claim 1 further comprising:
   generating, using a second algorithm, at least a partial explanation of the result of the first model.

4. The computer implemented method of claim 1 further comprising:
   determining, within detection data, an initial set of alert-generating detection data associated with an initial set of alerts, the detection data including the initial set of alert-generating detection data and an initial set of non-alert-generating data; and
   training, prior to training the first model, a second model based on the initial set of alert-generating data and the case management signal data associated with an initial set of alerts associated with the initial set of alert generating data.

5. The computer implemented method of claim 4 further comprising:
   identifying, within the detection data and using the second model, an updated set of alert-generating detection data and an updated set of non-alert generating detection data,
   wherein the first model is trained on the unbiased training data, the unbiased training data based on the sampled case management signal data from the plurality of entities, the updated set of alert-generating detection data, and the updated set of non-alert-generating detection data.

6. The computer implemented method of claim 4, wherein the second model is a first true-positive model and the first model is a second true positive model.

7. The computer implemented method of claim 1, wherein the case management signal data includes one or more of case closure data, escalation data, time on page, and one or more comment quality metrics.

8. The computer implemented method of claim 1 further comprising:
   anonymizing alerts, case management signal data, and detection data associated with a first entity;
   anonymizing alerts, case management signal data, and detection data associated with a second entity; and
   aggregating the anonymized alerts, case management signal data, and detection data associated with the first entity and second entity into consortium data;
   wherein the consortium data includes the case management signal data from the plurality of entities.

9. A system comprising:
   a processor; and
   a memory, the memory storing instructions that, when executed by the processor, cause the system to:
      obtain consortium data including case management signal data from a plurality of entities, wherein the case management signal data is associated with a plurality of alerts, the case management signal data anonymized and based on human interaction;
      generate an unbiased training data set using fairness sampling of the consortium data from the plurality of entities;
      perform a fairness coefficient training based on the unbiased training data set;

apply one or more fairness coefficients to the unbiased training data set;

train a first model based on the unbiased training data set with the one or more fairness coefficients applied, the unbiased training data set including a subset of case management signal data, the subset of case management signal data associated with the one or more alerts; and generate a result including one or more new alerts based on the first model.

10. The system of claim 9, wherein the one or more new alerts are associated with a reduced incidence of false positives.

11. The system of claim 9, wherein the memory further stores instructions that, when executed by the processor, cause the system to:

generate, using a second algorithm, at least a partial explanation of the result of the first model.

12. The system of claim 9, wherein the memory further stores instructions that, when executed by the processor, cause the system to:

determine, within detection data, an initial set of alert-generating detection data associated with an initial set of alerts, the detection data including the initial set of alert-generating detection data and an initial set of non-alert-generating detection data; and train, prior to training the first model, a second model based on the initial set of alert-generating data and the case management signal data associated with an initial set of alerts associated with the initial set of alert-generating detection data.

13. The system of claim 12, wherein the memory further stores instructions that, when executed by the processor, cause the system to:

identify, within the detection data and using the second model, an updated set of alert-generating detection data and an updated set of non-alert generating detection data, wherein the first model is trained on the unbiased training data, the unbiased training data based on the sampled case management signal data from the plurality of entities, the updated set of alert-generating detection data, and the updated set of non-alert-generating detection data.

14. The system of claim 12, wherein the second model is a first true-positive model and the first model is a second true positive model.

15. The system of claim 9, wherein the case management signal data includes one or more of case closure data, escalation data, time on page, and one or more comment quality metrics.

16. The system of claim 9, wherein the memory further stores instructions that, when executed by the processor, cause the system to:

anonymize alerts, case management signal data, and detection data associated with a first entity;

anonymize alerts, case management signal data, and detection data associated with a second entity; and aggregate the anonymized alerts, case management signal data, and detection data associated with the first entity and second entity into consortium data;

wherein the consortium data includes the case management signal data from the plurality of entities.

* * * * *